United States Patent
Dunn et al.

(10) Patent No.: US 10,666,774 B2
(45) Date of Patent: May 26, 2020

(54) MESSAGE PROCESSING

(71) Applicant: INTERNATIONAL BUSINESS MACHINES CORPORATION, Armonk, NY (US)

(72) Inventors: Tim Dunn, Hursley (GB); Martin A. Ross, Hursley (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 317 days.

(21) Appl. No.: 15/071,450

(22) Filed: Mar. 16, 2016

(65) Prior Publication Data

US 2017/0272360 A1 Sep. 21, 2017

(51) Int. Cl.
*H04L 29/06* (2006.01)

(52) U.S. Cl.
CPC .................................. *H04L 69/22* (2013.01)

(58) Field of Classification Search
None
See application file for complete search history.

(56) References Cited

U.S. PATENT DOCUMENTS

| | | | |
|---|---|---|---|
| 7,216,181 B1 * | 5/2007 | Jannu | H04L 12/1859 709/201 |
| 7,574,347 B2 | 8/2009 | Wang | |
| 7,870,295 B2 | 1/2011 | Johnson | |
| 8,397,158 B1 | 3/2013 | Nethi et al. | |
| 8,763,008 B2 | 6/2014 | Malladi et al. | |
| 9,319,362 B1 * | 4/2016 | McAllister | H04L 51/12 |
| 2007/0186050 A1 * | 8/2007 | Luick | G06F 12/0862 711/137 |
| 2007/0280140 A1 * | 12/2007 | Venketesan | H04L 12/4633 370/254 |
| 2008/0082484 A1 * | 4/2008 | Averbuch | G06F 17/30938 |
| 2009/0070349 A1 * | 3/2009 | Hiscock | G06F 17/30958 |
| 2011/0161929 A1 * | 6/2011 | Keating | G06F 9/455 717/120 |
| 2011/0264819 A1 * | 10/2011 | Srinivasan | H04L 12/6418 709/231 |
| 2012/0099594 A1 * | 4/2012 | Lau | H04L 12/2807 370/392 |
| 2015/0161098 A1 | 6/2015 | Granshaw et al. | |
| 2016/0094325 A1 * | 3/2016 | Liu | H04L 23/02 370/329 |

OTHER PUBLICATIONS

Anonymous, "JSON and SML Dynamic Serialization of Java Objects," IPCOM000193813D, Mar. 9, 2010, pp. 1-3 (+ cover).
Rahien, Ayende, "Reducing Parsing Costs in RavenDB," Aug. 7, 2015, pp. 1-3.

* cited by examiner

*Primary Examiner* — Jonathan A Bui
*Assistant Examiner* — Mohammad Yousuf A. Mian
(74) *Attorney, Agent, or Firm* — Alexander Jochym; Matthew M. Hulihan; Heslin Rothenberg Farley & Mesiti PC

(57) ABSTRACT

Processing a message that includes a sequence of data fields, each including data in a native format of the message. Program code for handling the message is analyzed to determine an intended destination of the message and an associated operation of the intended destination. A data format for the operation of the intended destination may then be determined. Based on this data format, data of the message may be passed to the intended destination in either the native format of the message or a parsed format differing from the native format.

19 Claims, 6 Drawing Sheets

MESSAGE PROCESSING

BACKGROUND

One or more aspects of the present invention relate to the field of processing a message, such as a message communicated in a service-oriented architecture (SOA).

Many business processes rely on service-oriented architectures (SOAs). Such architectures facilitate the cooperation of computers over a network, such as the Internet, without requiring an agreed communication standard, e.g. message format, for communications between such computers.

Services are typically requested and deliverables are typically returned in the form of messages between computers or between software applications running on these computers to be more precise. Such messages may be generated in many different formats, which format for instance may depend on the platform and/or the programming language used to generate the message. Therefore, in order to be able to forward the message to an intended destination, e.g. a computer offering a particular service, the incoming message typically needs to be converted into a format that can be understood by its destination or at least the relevant information needs to be extracted from the incoming message.

To this end, the SOA typically comprises a message broker, which is a software module implementing the required message conversion or data extraction. The message broker typically has access to so-called message schemas, which define the structure and the type of content that each data field within the message can contain.

The message broker typically further comprises some flow logic, i.e. program code, which for instance may include routing information for routing the relevant contents of the message to the intended destination. For the message broker to successfully pass on the message or relevant contents thereof to an intended destination, the message broker typically requires one or more parsers that parse the incoming message based on the information provided by the message schema of that message.

SUMMARY

One or more aspects of the present invention seek to provide a method for processing a message that can provide improved (e.g., reduced) processor and memory utilization. Further, one or more aspects of the present invention seek to provide a computer program product including computer program code for implementing the method when executed on a processor of a data processing system. Yet further, one or more aspects seek to provide a data processing system adapted to execute this computer program code.

In one embodiment, a computer-implemented method of processing a message comprising a sequence of data fields each comprising data in a native format of the message is provided. The method includes: analyzing program code for handling the message to determine an intended destination of the message and an associated operation of the intended destination; determining a data format for the operation of the intended destination; and based on the data format, passing data of the message to the intended destination in either the native format of the message or a parsed format differing from the native format.

BRIEF DESCRIPTION OF THE DRAWINGS

Embodiments of the present invention will now be described, by way of example only, with reference to the following drawings, in which.

DETAILED DESCRIPTION

Figure 1:
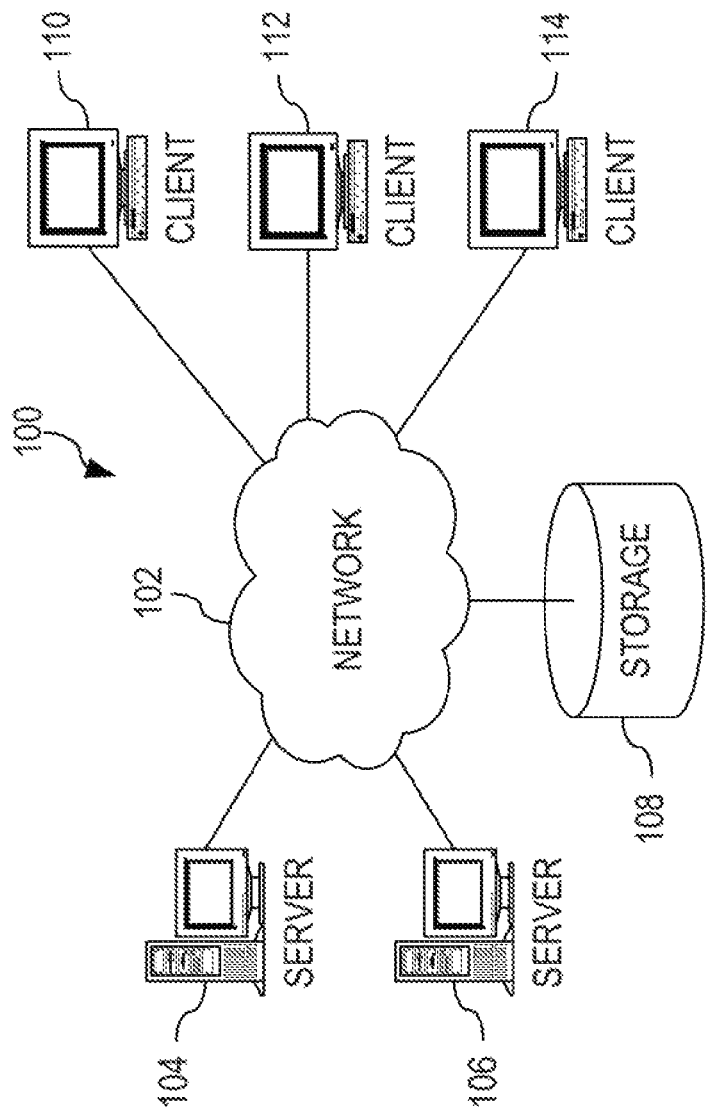
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (data processing) system may be a single device or a collection of distributed devices that are adapted to execute one or more embodiments of the methods of aspects of the present invention. For instance, a system may be a personal computer (PC), a server or a collection of PCs and/or servers connected via a network such as a local area network, the Internet and so on to cooperatively execute at least one embodiment of the methods of aspects of the present invention.

Described herein is a concept for processing a message wherein program code for handling the message is analyzed to identify a data format in which to pass data of the message to an intended destination. The identified data format may be referred to herein as a selected or a preferred data format. However, the use of the term, "selected" or "preferred", is not meant to be limiting in any way. By evaluation of a selected or preferred data format, data of the message may be passed on in a format which helps to reduce processing and/or data storage requirements, for example by avoiding unnecessary data processing and/or storage when propagating the message.

Embodiments may therefore avoid duplication of data parsing operations and/or help to improve processing efficiency.

For instance, one or more aspects may enable identification that data bytes in a native message format (e.g., native bytes) are to be used for improved efficiency (e.g., because the destination node will serialize the whole message), and that there is therefore, no need to construct and propagate a message tree. In such circumstances, embodiments may be adapted to only propagate the native bytes and discard the message tree which frees up memory and saves computational costs.

Illustrative embodiments may therefore provide concepts for analyzing a message integration flow logic to determine the most appropriate data input format for a subsequent node following a read-only operation. Dynamic fast-serialization optimization may therefore be provided by proposed embodiments.

Modifications and additional steps to a traditional message processing system may also be proposed which may enhance the value and utility of aspects of the present invention.

Figure 2:
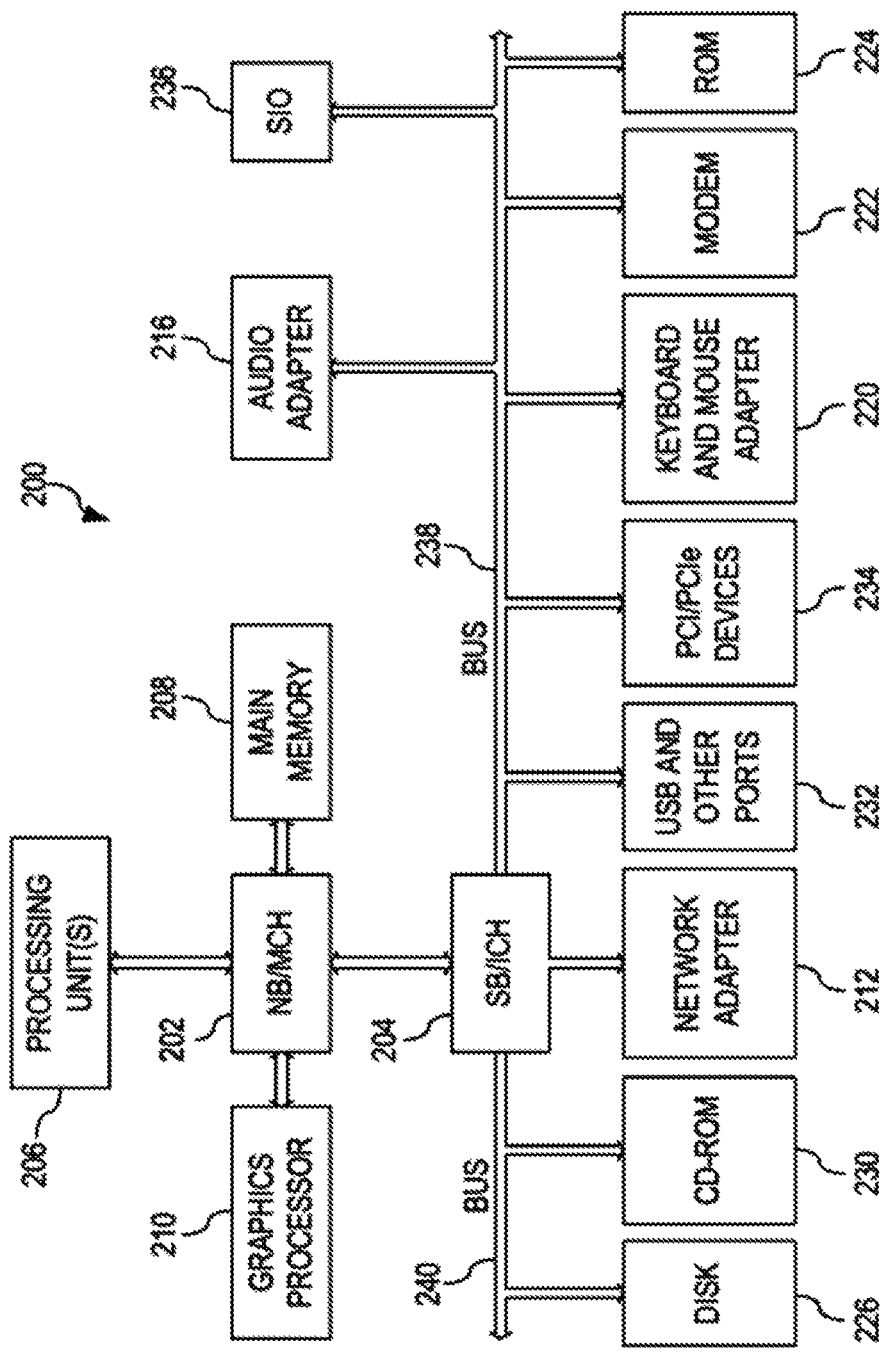
FIG. 2 is a block diagram of an example data processing system in which aspects of the illustrative embodiments may be implemented.

Illustrative embodiments may be utilized in many different types of messaging processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of aspects of the present invention.

FIG. 1 depicts a pictorial representation of an example distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of aspects of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

One aspect may enhance a message processing system by reducing re-parsing costs or making operations (such as serialization) more efficient. Embodiments may enable a data format (e.g., selected data format) to be identified and then used during the forwarding on of message data. Such aspects can extend or improve the processing capabilities or efficiency of a SOA system.

Figure 3:
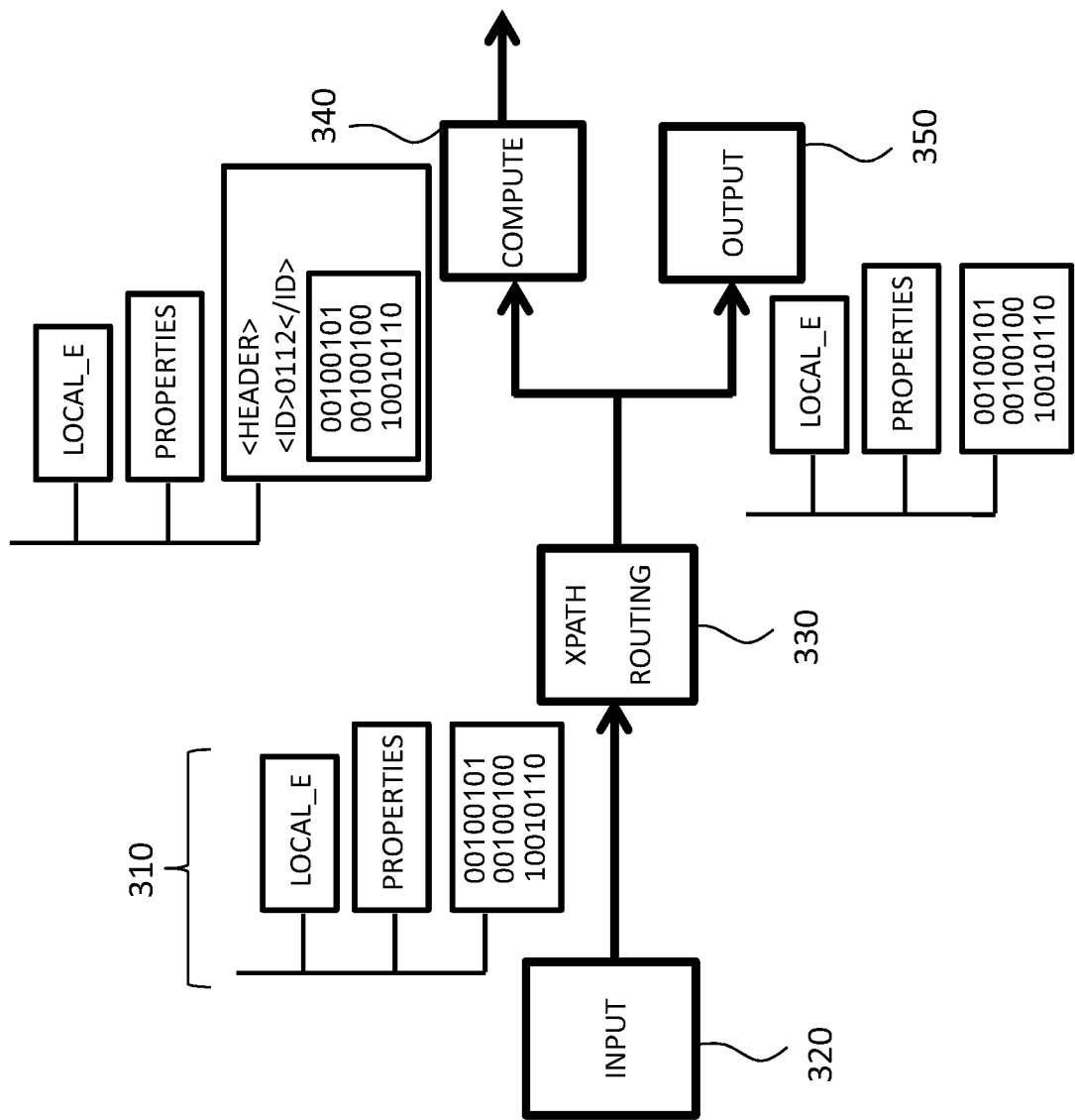
FIG. 3 is a simplified block diagram of an example implementation of an embodiment.

Turning now to FIG. 3, an example implementation of an embodiment will be described.

The integration flow of FIG. 3 illustrates input message 310 entering an integration flow via an input 320. An XPath Routing 330 (read-only) operation is performed which partially parses data in the message body.

A first (top) path following an XPath Routing 330 operation enters into a compute node 340 subsequently. According to one aspect, it is determined, through flow analysis, or through historical data access analysis, that the compute node 340 would likely parse the same data again. Thus, it is determined that the data format (e.g., selected data format) is the parsed format and, accordingly, the partially parsed format message assembly (from the XPath Routing 330 operation) is propagated along the first (top) path of the flow to the compute node 340.

A second (bottom) path from the XPath Routing 330 operation enters an output node 350. It is determined that, via knowledge of the program flow or through historical data access analysis, the message data is to be serialized for the transmission protocol. Thus, it is determined that the data format (e.g., selected data format) is the native data format of the message and, accordingly, the native data bytes of the message 310 are preserved for the second (bottom) path. These native data bytes are those prior to the "read-only" XPath routing node 330, as it is known that these would not have changed as a result of the XPath routing 330 operation.

In one embodiment, properties of the message may be factored into an historical data access collection (e.g., database or data structure). Analysis of such historical data access information may enable determination of a selected data format. For instance, in the example of FIG. 3, it may be determined that in the compute node 340, messages with a property "A" (which conforms to schema "A" for instance) typically have a particular access pattern within the node, whereas messages with a property "B" have a different access pattern that may benefit from preserving the native bytes (depending on the data access points). Using such information, determination of a selected data format may be achieved.

Also, subsequent nodes or logic in the integration flow may be utilized in the determination of a selected data format. For example, if a node following the compute node 340 in the example of FIG. 3 is an XSLT node which requires serialized data to act upon and, for particular message properties, the path through the compute node 340 typically results in little or no parsing (and no data manipulation), it may be that the XSLT node is to utilize the original (native) data bytes (if there is no data manipulation within the compute node 340 that would invalidate those original bytes). Such data manipulation may be monitored at the API/Message Model level, for example.

Another approach, or one that could be taken if the system were unsure of the more efficient (e.g., selected) format selection, would be to first select to preserve the native bytes and monitor CPU time and amount (e.g., KB) of data parsing and/or serialization that is performed. For subsequent messages with equivalent message properties, it may be selected to preserve the parsed message data format and monitor CPU time and amount (e.g., KB) of data parsing and/or serialization. A comparison of the measurements may then be made to determine the most appropriate message data format to preserve.

According to another aspect, a selection of the most appropriate previous message copies within the flow may be utilized by at least one node based on requirements and/or data access. For instance, in the example of FIG. 3, if the XPath routing 330 and compute nodes 340 are "Read Only", they would not modify the message content. As a result, for a subsequent node (not shown) following the compute node 340, either the message copy entering the XPath routing node 330 or compute node 340 could be utilized to pass into the subsequent node.

Upon entering a node that could modify the message content, previous copies of the message may be indicated (e.g., marked or flagged) as "dirty" or "unclean" and then not used subsequently in that path of execution (unless that original message copy was subsequently propagated to a secondary terminal—e.g. with a Flow Order Node). This may be performed at the message model level, such that message copies are marked/tagged dirty/unclean when an actual data mutation occurs, as opposed to if a message copy simply enters a node in which it may (or may not) happen.

Figure 4:
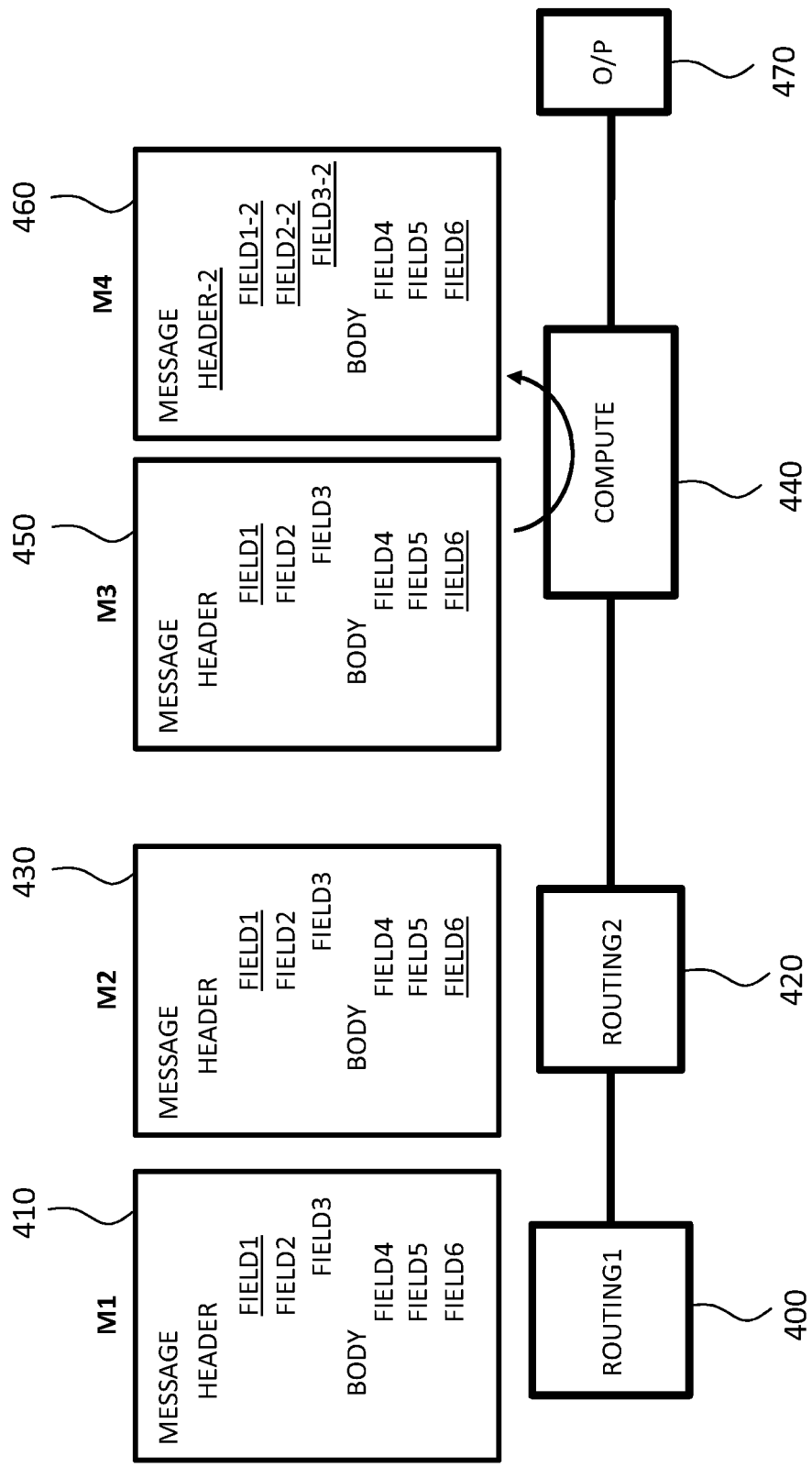
FIG. 4 is a simplified block diagram of an example implementation of an embodiment, wherein determination of a data format is based on field access patterns.

By way of further example, an embodiment is illustrated in FIG. 4, wherein determination of a data format (e.g., selected format) is based on field access patterns.

Here, a first node ("Routing1") 400 in the message flow comprises a routing operation which accesses a first field "Field1" in the header section of a first/original message "M1" 410. A second node ("Routing2") 420 in the message flow comprises a routing operation which accesses a sixth field "Field6" in the body section of the message to result in second message "M2" 430.

Subsequently in the message flow, a "compute" node 440 performs a transformation operation of the header of the message (transforming third message "M3" 450 to a fourth message "M4" 460) before passing to an output node "O/P" 470. The output node 470 performs an operation wherein the entire message is serialized. As such, when the output node 470 is reached, because the message has not been modified (but only accessed in Routing2 420), the message still has the data bytes from the original message M1 410.

Thus, by using the original message M1 410 in the compute node 440 (as opposed to using the second message M2), the message body still comprises un-parsed bytes (i.e., in the native data format of the original message M1) and the header has been partially parsed. Because the body is also not accessed/modified in the operation of the compute node 440, the bytes exiting the compute node 440 are still native data bytes of the first message, and this enables the serialization operation of the output node 470 to be more efficient.

By comparison, carrying the second message M2 430 through would mean that the access of the sixth field Field6 by the second node Routing2 (using partial parsing which parsed the whole of the body section of the message) had parsed the second message M2. The second message M2 would then have to be serialized, which is a step (and significant cost) that is avoided by the aspect to carry through the original message and use the native databytes.

Figure 5:
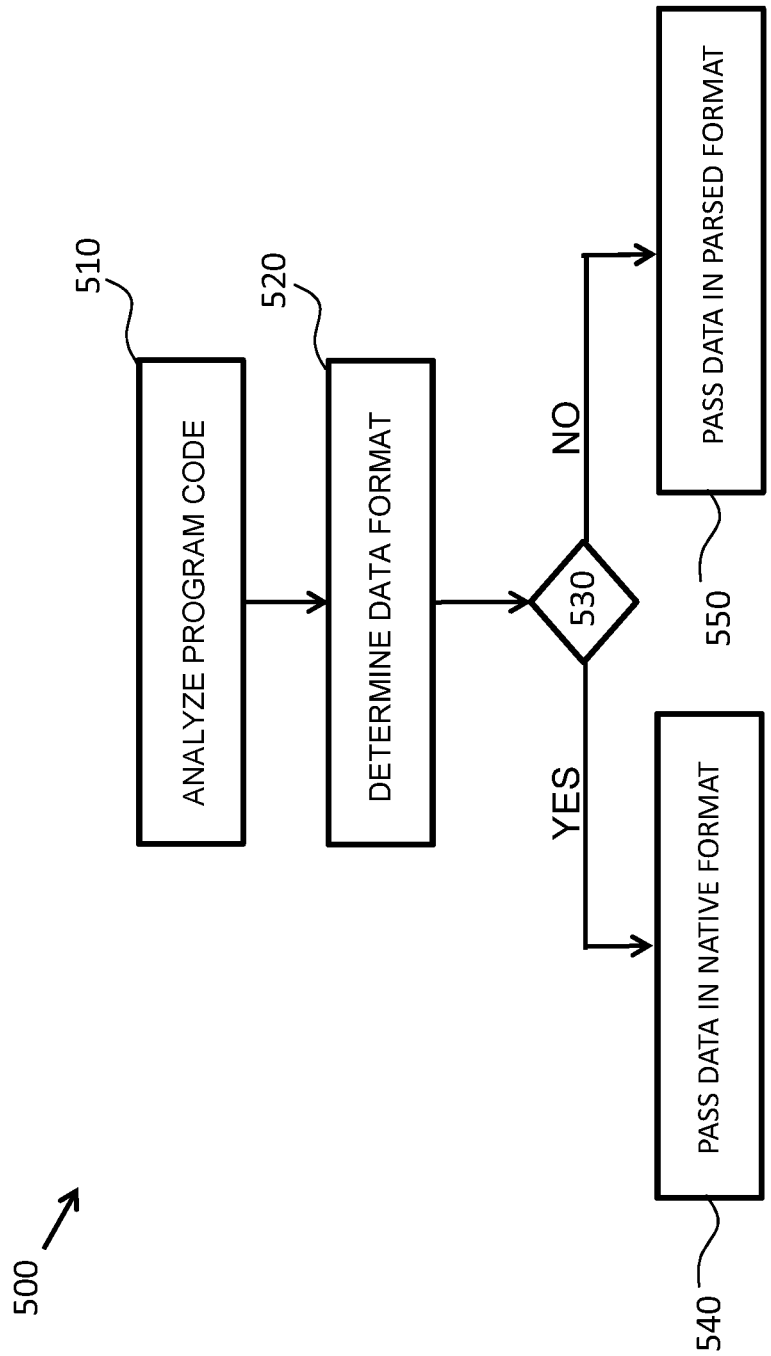
FIG. 5 is a flow diagram of a computer-implemented method according to an embodiment.

Turning to FIG. 5, there is depicted a flow diagram of a computer-implemented method 500 according to an embodiment. Here, the method may be for processing an XML message comprising a sequence of data fields each comprising data in a native format of the message.

The method begins at step 510 wherein program code for handling the message is analyzed to determine an intended destination of the message and an associated operation of the intended destination.

Next, in step 520, a data format (e.g., selected data format) for the operation of the intended destination is determined. Here, many different approaches may be used, either alone or in combination. For example, the intended message flow of the program code may be analyzed along with a property of nodes on a message flow path to the intended destination. Instead, or in addition, historical information may be used. Such historical information may, for example, relate to previous data access events by the message, nodes on a message flow path to the intended destination, and/or the operation of the intended destination.

Alternatively, or additionally, the step 520 of determining a data format may include determining a property of the message, and then assessing a dependency of the intended message flow of the program code on the property of the message. In this way, a particular requirement of an operation in the message flow may be accounted for in consideration of the message properties.

By way of further example, the step 520 of this embodiment includes determining if the operation of the intended destination requires or results in serialization of data of the message. If it is determined that the operation of the intended destination requires or results in serialization of data of the message, the data format may then be determined to be the native format of the message (so as to enable efficient serialization for example).

Subsequently, in step 530, it is checked whether or not the data format (that was determined previously in step 520) is the native format of the message. If in step 530, the answer is affirmative (i.e., the data format is the native format of the message), the method proceeds to step 540. In step 540, data of the message is passed to the intended destination in the native format of the message. Conversely, if in step 530, the answer is negative (i.e., the data format is not the native format of the message), the method proceeds to step 550. In step 550, data of the message is passed to the intended destination in a parsed format differing from the native format.

By way of further example, a modification to the method depicted in FIG. 5 may include the additional step of collecting run-time statistics relating to data access events by the message, nodes on a path to the intended destination, and the operation of the intended destination. Such run-time statistics may then be used (e.g., stored, analyzed, processed, etc.) as historical information which may be employed, for example, in the step 520 of determining a data format for an operation.

It will be appreciated that embodiments, such as that presented above with reference to FIG. 5, may provide the following benefits:

(i) Improved performance for message parsing/serialization; and (ii) Reduced memory requirements.

Through program flow analysis, embodiments may enable a better understanding of application requirements and will therefore avoid propagation of multiple data formats simultaneously, which will in turn reduce associated memory requirements.

Take, for instance, a 1 MB message entering a filter node, which routes messages based on the last field, followed by an XSLT node. From analysis of the program/message flow, it may be identified that the XSLT node is subsequent to the initial filter node and is to use the raw (i.e., native) bytes of the message. According to one embodiment, the message is fully parsed in the filter node but the message tree is discarded (e.g., not propagated or passed on) since it has been identified as not being the preferred format for the XSLT node. Just the raw bytes are therefore passed to the XSLT node, such that only the 1 MB memory for the bytes goes forward. In direct contrast, in existing/conventional approaches, both the raw and parsed message tree are kept and propagated (e.g., 1 MB bytes native data+>1 MB fully bloated message tree; most likely significantly greater than 1 MB).

Figure 6:
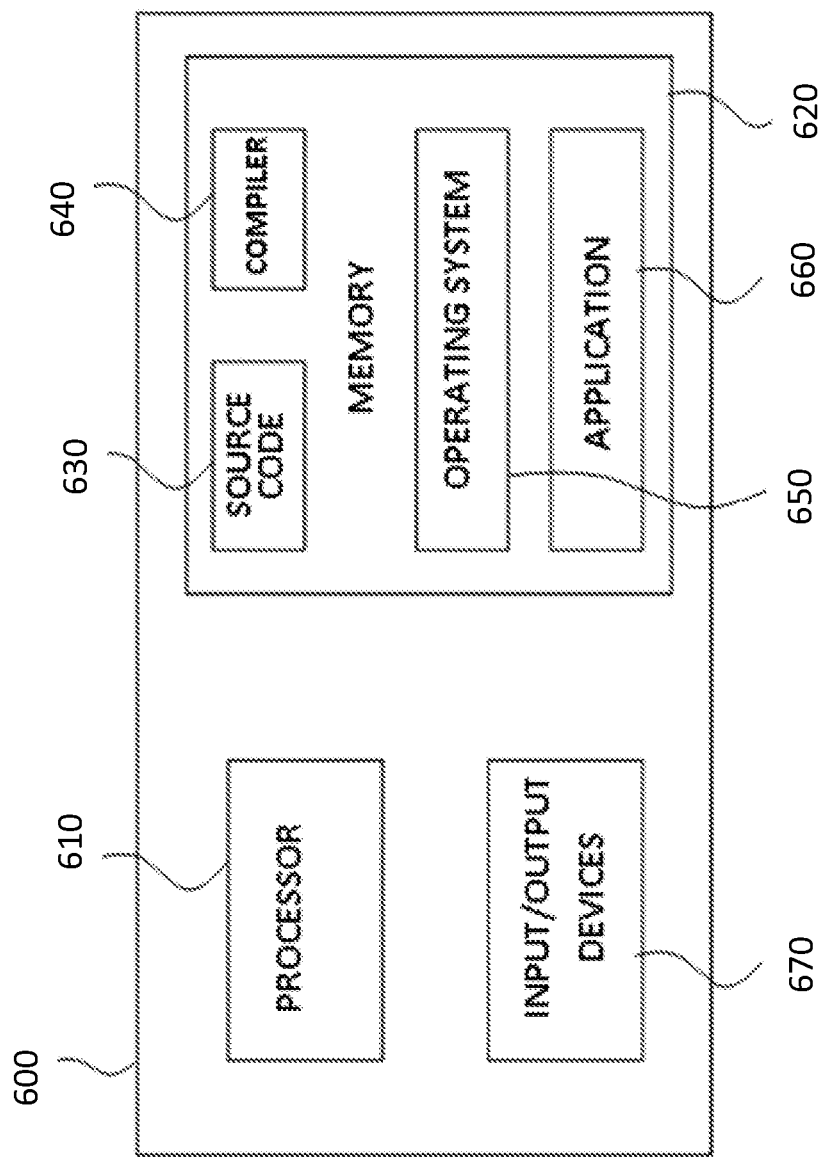
FIG. 6 is a simplified block diagram of a computer within which one or more parts of an embodiment may be employed.

FIG. 6 illustrates an example of a computer 600 within which one or more parts of an embodiment may be employed. Various operations discussed above may utilize the capabilities of the computer 600. For example, one or more parts of a system for converting synchronous operations into asynchronous operations may be incorporated in any element, module, application, and/or component discussed herein.

The computer 600 may include, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a microprocessor.

The memory 620 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with example embodiments. As illustrated, the application 660 comprises numerous functional components for implementing the features and operations of the example embodiments. The application 660 of the computer 600 may represent various applications, computational units, logic, functional units, processes, operations, virtual entities, and/or modules in accordance with example embodiments, but the application 660 is not meant to be a limitation.

The operating system 650 controls the execution of other computer programs, and provides scheduling, input-output control, file and data management, memory management, and communication control and related services. It is contemplated that the application 660 for implementing example embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. The I/O devices 670 may include input devices such as, for example but not limited to, a mouse, keyboard, scanner, microphone, camera, etc. Furthermore, the I/O devices 670 may also include output devices, for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of aspects of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

One or more aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

As described herein, according to an embodiment of the present invention, there is provided a computer-implemented method of processing a message comprising a sequence of data fields each comprising data in a native format of the message, the method comprising: analyzing program code for handling the message to determine an intended destination of the message and an associated operation of the intended destination; determining a data format for the operation of the intended destination; and based on the data format, passing data of the message to the intended destination in either the native format of the message or a parsed format differing from the native format.

Provided is a concept of analyzing program code, e.g. the message flow of message integration, for a particular message to identify a data format in which to pass data of the message to an intended destination. By evaluation of a data format, it may be determined as to what format the data should be in when passed on to an intended destination. For example, evaluation of the format may identify whether to pass on (e.g., forward, transmit, propagate, communicate, etc.) either a parsed version of the message (e.g., to reduce re-parsing costs) or the preserved data in its native format of the message (e.g., to make serialization more efficient). This may therefore minimize processing and/or data storage requirements by avoiding unnecessary data processing and/or storage when propagating a message. In particular, it may help to avoid duplication of data parsing operations and/or help to improve processing efficiency by providing native data bytes to a serialization operation for example.

A message may have a tree structure, wherein the data sequence of the data fields comprises sequence groups, each group defining a parent node and N sibling nodes of the tree, wherein N is an integer of at least zero. In other words, the message may be a hierarchical message. Parsing such a hierarchical message may therefore evaluate each branch of the tree.

By way of demonstrating a potential benefit, when propagating a message to the next destination node in a message flow or application, one or more aspects may identify that data bytes in a native message format (e.g., native bytes) are to be used for improved efficiency (e.g., because the destination node will serialize the whole message), and that there is therefore no need to construct and propagate a message tree. Thus, in such circumstances, just propagating the native bytes and discarding the message tree may free up memory and save computational costs.

One or more aspects may therefore employ analysis of message integration flow logic to determine the most appropriate data input format for a subsequent node following a read-only operation. For instance, where it is identified that the subsequent node comprises logic requiring serialized data, it may be determined that the most appropriate data input format is the native data format of the message (e.g., native bytes), and thus, passing on of the message data may be limited to passing the preserved native data bytes. Conversely, where it is identified that the subsequent node comprises logic potentially accessing particular message contents, it may be determined that the most appropriate data input format is a parsed data format of the message (e.g., a parsed data model), and thus, passing on of message data may be adapted to preserve a parsed data format or model.

Some aspects may employ run-time analysis of message access to identify, for each path or flow, what data format to preserve, and this may be done based on an analysis of a (possible known, probable, or likely) subsequent data access. Alternatively, or additionally, identification of a data format may be based on historical information/data relating to previous data access events that may for example be caused by: an identical message; a similar message; an equivalent message; the destination node; nodes in a message flow path; or operations of such nodes.

Many different ways to determine a data format may be employed by embodiments, and these may be implemented in isolation or in combination.

In an embodiment, the determining a data format may comprise: analyzing an intended message flow of the program code and one or more properties of nodes on a path to the intended destination. Embodiments may therefore employ the concept of analyzing flow logic to determine the most appropriate input format to a subsequent node. Also, further subsequent nodes or logic in the integration flow may be utilized in the determination of the appropriate input format such that if a node (e.g., an ultimate/final destination node) following the subsequent node were an XSLT node requiring serialized data, for example, this may override the fact that the appropriate format for its preceding node is a parsed data format.

The determining a data format may comprise: analyzing historical information relating to previous data access events by at least one of: the message; nodes on a path to the intended destination; and the operation of the intended destination. Such analysis of past performance for the same message, nodes, and/or destination may help to ensure that the correct or most appropriate data format is determined to be selected, and selecting the data format with greater accuracy may help with optimizing memory and/or processing savings.

In some embodiments, the determining a data format may comprise: determining a property of the message; and assessing a dependency of an intended message flow of the program code on the property of the message. Such analysis of message properties may further enhance the quality of the determination of a data format.

The determining a data format may comprise: determining the data format to be the native format of the message, the parsed format, or a combination of the native format and the parsed format. Also, the passing data of the message to the intended destination may comprise passing data of the message to the intended destination in the selected format. Embodiments may therefore be designed to determine which of the native format or the parsed format is most appropriate. This may help to ensure that the appropriate data format is identified while reducing complexity and/or ensuring the determination can be achieved in a simple and cost-effective manner.

In an embodiment, the determining a data format may comprise: determining if the operation of the intended destination requires or results in serialization of data of the message. If it is determined that the operation of the intended destination requires or results in serialization of data of the message, the data format may then be determined to be the native format of the message. Embodiments may therefore determine that the most appropriate data input format is the native data format of the message (e.g., native bytes) when it is identified that a subsequent node comprises logic requiring serialized data. Passing on of message data may therefore be limited to passing the preserved native data bytes, thus reducing memory and processing overhead.

The determining a data format may comprise: determining if the operation of the intended destination requires or results in data of the message being parsed; and if it is determined that the operation of the intended destination requires or results in data of the message being parsed, the data format may be determined to be the parsed format. Embodiments may therefore determine that the most appropriate data input format is a parsed data format of the message (e.g., a parsed data model) when it is identified that a subsequent node comprises logic potentially accessing particular message contents. Passing on of message data may thus be adapted to preserve a parsed data format or model, thereby reducing re-parsing costs/overheads.

An embodiment may further comprise collecting run-time statistics relating to data access events by at least one of: the message; nodes on a path to the intended destination; and the operation of the intended destination. The run-time statistics may then be stored as historical data for use in determining a data format for an operation. Analysis of the most appropriate data format may therefore be based on past and actual statistics and performance, thus improving accuracy of the analysis.

In one example, the message is an Extensible Markup Language (XML), Java Script Object Notation (JSON) or Comma Separated Values (CSV) message.

According to another embodiment of the present invention, there is provided a computer program product for processing a message comprising a sequence of data fields each comprising data in a native format of the message, the computer program product comprising a computer readable storage medium having program instructions embodied therewith, the program instructions executable by a processing unit to cause the processing unit to perform a method according to one or more embodiments when executed on at least one processor of a data processing system.

According to yet another aspect, there is provided a data processing system comprising at least one processor and the computer program product according to one or more embodiments, wherein the at least one processor is adapted to execute the computer program code of the computer program product.

The data processing system may further comprise: the program code for handling the message; and/or a schema defining the native format of the message.

The data processing system may be adapted to act as a message broker between a message producer and a message consumer.

The data processing system may be adapted to implement a part of a service-oriented architecture.

Thus, there may be a system which evaluates a message flow to determine whether to pass either a parsed version of a message or the preserved message data in its native format. Taking such an approach may reduce processing and/or data storage requirements by avoiding unnecessary data processing and/or storage when propagating a message in accordance with a predefined program code. For instance, it may avoid duplication of data parsing operations and/or help to improve processing performance by providing native data bytes to a serialization operation.

Embodiments may be employed in a Service-Oriented Architecture (SOA) for the provision of services over a network, such as the Internet.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of processing a message comprising a sequence of data fields each comprising data in a native format of the message, the computer-implemented method comprising:
    analyzing program code for handling the message to determine an intended destination of the message and identify an associated operation, of the intended destination, to be applied to the data by the intended destination;
    determining a data format for the associated operation of the intended destination;
    selecting, based on the determined data format for the associated operation of the intended destination, a format in which to pass the data of the message to the intended destination, the selecting being made between the native format of the message and a parsed format, differing from the native format, in which the data of the message has the operation of the intended destination applied thereto to parse the data; and
    based on the selecting, passing the data of the message to the intended destination in the native format, of the message, in which the data of the message already exists, or the parsed format differing from the native format.

2. The computer-implemented method of claim 1, wherein the determining the data format comprises analyzing an intended message flow of the program code and one or more properties of nodes on a path to the intended destination.

3. The computer-implemented method of claim 1, wherein the determining the data format comprises analyzing historical information relating to previous data access events by at least one of the message, nodes on a path to the intended destination, or the associated operation of the intended destination.

4. The computer-implemented method of claim 1, wherein the determining the data format comprises:
    determining a property of the message; and
    assessing a dependency of an intended message flow of the program code on the property of the message.

5. The computer-implemented method of claim 1, wherein the determining the data format comprises determining the data format to be the native format of the message, the parsed format, or a combination of the native format and the parsed format.

6. The computer-implemented method of claim 1, wherein the determining the data format comprises:
    determining whether the associated operation of the intended destination requires or results in serialization of data of the message; and
    based on the associated operation of the intended destination requiring or resulting in serialization of data of the message, determining the data format to be the native format of the message.

7. The computer-implemented method of claim 1, wherein the determining the data format comprises:
    determining whether the associated operation of the intended destination requires or results in data of the message being parsed; and
    based on the associated operation of the intended destination requiring or resulting in data of the message being parsed, determining the data format to be the parsed format.

8. The computer-implemented method of claim 1, further comprising:
    collecting run-time statistics relating to data access events by at least one of the message, nodes on a path to the intended destination, or the operation of the intended destination; and
    storing the run-time statistics as historical data for use in determining the data format for an operation.

9. The computer-implemented method of claim 1, wherein the message is an Extensible Markup Language (XML), Java Script Object Notation (JSON) or Comma Separated Values (CSV) message.

10. A computer system for processing a message comprising a sequence of data fields each comprising data in a native format of the message, the computer system comprising:
    a memory; and
    a processor in communication with the memory, wherein the computer system is configured to perform a method, said method comprising:
        analyzing program code for handling the message to determine an intended destination of the message and identify an associated operation, of the intended destination, to be applied to the data base the intended destination;
        determining a data format for the associated operation of the intended destination;
        selecting, based on the determined data format for the associated operation of the intended destination, a format in which to pass the data of the message to the intended destination, the selecting being made between the native format of the message and a parsed format, differing from the native format, in which the data of the message has the operation of the intended destination applied thereto to parse the data; and
        based on the selecting, passing the data of the message to the intended destination in the native format, of the message, in which the data of the message already exists, or the parsed format differing from the native format.

11. The computer system of claim 10, wherein the determining the data format comprises analyzing an intended message flow of the program code and one or more properties of nodes on a path to the intended destination.

12. The computer system of claim 10, wherein the determining the data format comprises:
   determining a property of the message; and
   assessing a dependency of an intended message flow of the program code on the property of the message.

13. The computer system of claim 10, wherein the determining the data format comprises:
   determining whether the associated operation of the intended destination requires or results in serialization of data of the message; and
   based on the associated operation of the intended destination requiring or resulting in serialization of data of the message, determining the data format to be the native format of the message.

14. The computer system of claim 10, wherein the determining the data format comprises:
   determining whether the associated operation of the intended destination requires or results in data of the message being parsed; and
   based on the associated operation of the intended destination requiring or resulting in data of the message being parsed, determining the data format to be the parsed format.

15. A computer program product for processing a message comprising a sequence of data fields each comprising data in a native format of the message, the computer program product comprising:
   a computer readable storage medium readable by a processing circuit and storing instructions for execution by the processing circuit for performing a method comprising:
      analyzing program code for handling the message to determine an intended destination of the message and identify an associated operation, of the intended destination, to be applied to the data by the intended destination;
      determining a data format for the associated operation of the intended destination;
      selecting, based on the determined data format for the associated operation of the intended destination, a format in which to pass the data of the message to the intended destination, the selecting being made between the native format of the message and a parsed format, differing from the native format, in which the data of the message has the operation of the intended destination applied thereto to parse the data; and
      based on the selecting, passing the data of the message to the intended destination in the native format, of the message, in which the data of the message already exists, or the parsed format differing from the native format.

16. The computer program product of claim 15, wherein the determining the data format comprises analyzing an intended message flow of the program code and one or more properties of nodes on a path to the intended destination.

17. The computer program product of claim 15, wherein the determining the data format comprises:
   determining a property of the message; and
   assessing a dependency of an intended message flow of the program code on the property of the message.

18. The computer program product of claim 15, wherein the determining the data format comprises:
   determining whether the associated operation of the intended destination requires or results in serialization of data of the message; and
   based on the associated operation of the intended destination requiring or resulting in serialization of data of the message, determining the data format to be the native format of the message.

19. The computer program product of claim 15, wherein the determining the data format comprises:
   determining whether the associated operation of the intended destination requires or results in data of the message being parsed; and
   based on the associated operation of the intended destination requiring or resulting in data of the message being parsed, determining the data format to be the parsed format.

* * * * *